(12) United States Patent
Kanda et al.

(10) Patent No.: US 9,796,814 B2
(45) Date of Patent: Oct. 24, 2017

(54) POLYAMIDE RESIN AND POLYAMIDE MOLDED BODY USING SAME

(71) Applicant: SAMSUNG SDI CO., LTD., Yongin-si (KR)

(72) Inventors: Tomomichi Kanda, Yokohamashi (JP); Tomoaki Shimoda, Yokohamashi (JP)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/037,501

(22) PCT Filed: Nov. 19, 2014

(86) PCT No.: PCT/KR2014/011141
§ 371 (c)(1),
(2) Date: May 18, 2016

(87) PCT Pub. No.: WO2015/080425
PCT Pub. Date: Jun. 4, 2015

(65) Prior Publication Data
US 2016/0280855 A1 Sep. 29, 2016

(30) Foreign Application Priority Data

Nov. 26, 2013 (JP) ................................. 2013-244007
Nov. 7, 2014 (KR) ........................ 10-2014-0154772

(51) Int. Cl.
C08G 69/30 (2006.01)
C08G 69/26 (2006.01)
C08G 69/28 (2006.01)
C08L 77/06 (2006.01)
C08J 5/00 (2006.01)

(52) U.S. Cl.
CPC ........... *C08G 69/265* (2013.01); *C08G 69/26* (2013.01); *C08G 69/28* (2013.01); *C08G 69/30* (2013.01); *C08J 5/00* (2013.01); *C08L 77/06* (2013.01); *C08J 2377/06* (2013.01)

(58) Field of Classification Search
CPC ....... C08L 77/06; C08G 69/265; C08G 69/26; C08G 69/30
See application file for complete search history.

(56) References Cited

U.S. PATENT DOCUMENTS

| 5,773,558 A | 6/1998 | Torre |
| 7,009,029 B2 | 3/2006 | Oka et al. |
| 8,324,307 B2 | 12/2012 | Harder et al. |
| 2005/0009987 A1* | 1/2005 | Hara ...................... C08L 29/04 525/56 |
| 2010/0105812 A1 | 4/2010 | Bussi et al. |
| 2012/0170277 A1* | 7/2012 | Tamura ................ C08G 69/265 362/296.02 |
| 2013/0225770 A1 | 8/2013 | Jang et al. |

FOREIGN PATENT DOCUMENTS

| CN | 103119083 A | 5/2013 |
| EP | 2476731 A1 | 7/2012 |
| KR | 10-2004-0000326 A | 1/2004 |
| KR | 10-2009-0021132 A | 2/2009 |
| KR | 10-2009-0123885 A | 12/2009 |
| KR | 10-2012-0040069 A | 4/2012 |
| WO | 2011/027562 A1 | 3/2011 |
| WO | 2015/080425 A1 | 6/2015 |

OTHER PUBLICATIONS

International Search Report in counterpart International Application No. PCT/KR2014/011141 dated Mar. 6, 2015, pp. 1-6.
Office Action in counterpart Chinese Application No. 201480064818.8 dated Mar. 17, 2017, pp. 1-5.

* cited by examiner

*Primary Examiner* — Gregory Listvoyb
(74) *Attorney, Agent, or Firm* — Additon, Higgins & Pendleton, P.A.

(57) ABSTRACT

A polyamide resin, according to the present invention, is formed through polycondensation of a monomer comprising 1,4-cyclohexanedicarboxylic acid, 1,10-decanediamine, and 1,12-dodecanediamine, wherein the molar ratio of 1,10-decanediamine and 1,12-dodecanediamine is approximately 10:90 to approximately 65:35. As a result, the polyamide resin capable of enabling high durability and color stability in the polyamide molded body can be provided.

22 Claims, No Drawings

POLYAMIDE RESIN AND POLYAMIDE MOLDED BODY USING SAME

CROSS-REFERENCE TO RELATED APPLICATIONS

This application claims priority to and the benefit of International Application No. PCT/KR2014/011141, filed Nov. 19, 2014, which published as WO 2015/080425on Jun. 4, 2015; Korean Patent Application No. 10-2014-0154772, filed in the Korean Intellectual Property Office on Nov. 7, 2014; and Japanese Patent Application No. 2013-244007, filed in the Japanese Patent Office on Nov. 26, 2013, the entire disclosure of each of which is incorporated herein by reference.

TECHNICAL FIELD

The present invention relates to a polyamide resin and a polyamide molded article manufactured using the same. More particularly, the present invention relates to a polyamide resin which allows a molded article manufactured using the same to exhibit high color stability at high temperature.

BACKGROUND ART

With excellent properties and easy melt molding, polyamide resins are broadly applied to materials for clothes, fibers for industrial materials, engineering plastics, and the like. Recently, polyamide resins used in the field of electric/electronic components, car components, and reflective materials are required to have further improved properties and functions. Particularly, there is a need for development of polyamide resins that are useful as reflective materials, suffer from little or no discoloration at high temperature, and exhibit good color stability at high temperature.

Generally, polyamide resins are prepared through polycondensation of a dicarboxylic acid and a diamine. For example, Patent Document 1 discloses a reflector for LEDs manufactured using a polyamide composition containing polyamide including 1,4-cyclohexanedicarboxylic acid as a dicarboxylic acid unit and a C4 to C18 aliphatic diamine as a diamine unit. Specifically, Patent Document discloses a polyamide resin obtained by preparing a low-order condensate (prepolymer) through polycondensation of 1,4-cyclohexanedicarboxylic acid and 1,11-undecanediamine in the presence of sodium hypophosphite monohydrate to obtain a low-order condensate (prepolymer), followed by solid-polymerization of the low-order condensate. However, the molded article disclosed in Patent Document 1 does not exhibit high temperature color stability at a desired high level. Therefore, there is a need for an improved polyamide resin.

RELATED LITERATURE (Patent Document 1) WO2011/027562 A pamphlet

DISCLOSURE

Technical Problem

It is an object of the present invention to provide a polyamide resin which allows a molded article manufactured using the same to exhibit high color stability at high temperature.

Technical Solution

The inventors of the present invention have conducted research to solve the problems as mentioned above. From the research, the inventors completed the present invention based on the finding that a polyamide resin obtained using monomers including 1,4-cyclohexanedicarboxylic acid as dicarboxylic acid and including 1,10-decanediamine and 1,12-dodecanediamine in a predetermined ratio has lower melting point than a polyamide resin obtained using 1,11-undecanediamine alone. In addition, the present inventors found that a polyamide molded article manufactured using the polyamide resin exhibited significantly improved color stability at high temperature as compared with typical polyamide molded articles.

In accordance with one aspect of the present invention, a polyamide resin is obtained through poly condensation of monomers including: 1,4-cyclohexanedicarboxylic acid; and 1,10-decanediamine and 1,12-dodecanediamine. Here, a mole ratio of the 1,10-decanediamine to the 1,12-dodecanediamine ranges from about 10:90 to about 65:35.

Advantageous Effects

Embodiments of the present invention can provide a polyamide resin which allows a molded article manufactured using the same to exhibit high color stability at high temperature.

BEST MODE

Hereinafter, embodiments of the present invention will be described in detail. However, it should be understood that the present invention is not limited to the following embodiments and should be defined only by the accompanying claims and equivalents thereof. Herein, when a certain value is described to be in a range of 「 X to Y 」, this means that the value is 「 greater than or equal to X and less than or equal to Y 」.

<Polyamide Resin>

A polyamide resin according to one embodiment of the present invention is prepared through polycondensation of monomers including: 1,4-cyclohexanedicarboxylic acid; and 1,10-decanediamine and 1,12-dodecanediamine. Here, a mole ratio of 1,10-decanediamine to 1,12-dodecanediamine ranges from about 10:90 to about 65:35.

The polyamide resin has lower melting point than a conventional polyamide resin disclosed in Patent Document 1, and a molded article manufactured using the same exhibits high color stability at high temperature. The mechanism providing such high color stability at high temperature is believed by the present inventors to be as follows. It should be understood that the present invention is not limited thereto.

As disclosed in Patent Document 1, when a polyamide molded article is used as an LED reflector, the LED reflector is subjected to high temperature exceeding 100° C. due to light emission from an LED. In this case, it has been said that it is impossible to suppress deterioration in brightness due to reduction in reflectance caused by discoloration of a resin itself. The present inventors thought that discoloration of the resin when used at high temperature in the atmosphere is due to a degradant in the molded article and such a degradant is generated due to thermal degradation (heat deterioration) during molding.

In a molding process such as injection molding, it is necessary to melt a polyamide resin by heating the resin to a temperature higher by 10° C. than the melting point thereof so as to reduce viscosity of the polyamide resin during molding. The polyamide resin according to the present invention has lower melting point than typical polyamide resins and thus it is possible to make moldings at lower temperature. As a result, the polyamide resin according to the present invention is considered to further suppress thermal degradation (heat deterioration) during molding, thereby providing high color stability at high temperature. Hereinafter, the polyamide resin according to the present invention will be described.

Dicarboxylic Acid

In the present invention, a dicarboxylic acid used as raw materials of the polyamide resin essentially includes 1,4-cyclohexanedicarboxylic acid. In one embodiment, the dicarboxylic acid may further include other dicarboxylic acids excluding the 1,4-cyclohexanedicarboxylic acid as monomers used as raw materials. The 1,4-cyclohexanedicarboxylic acid is preferably present in an amount of about 50 mol % or more, about 75 mol % or more, about 90 mol % or more, about 95 mol % or more, or about 100 mol % based on the total mole number of the dicarboxylic acid included in the monomers to sufficiently provide effects of the present invention. Within this range, the polyamide resin can exhibit high color stability at high temperature.

Examples of the dicarboxylic acid excluding the 1,4-cyclohexanedicarboxylic acid may include terephthalic acid, malonic acid, dimethyl malonic acid, succinic acid, glutaric acid, adipic acid, 2-methyl adipic acid, pimelic acid, 2,2-dimethyl glutaric acid, 3,3-diethyl succinic acid, suberic acid, 1,3-cyclopentanedicarboxylic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4, 4'-dicarboxylic acid, diphenylsulfone-4,4'-dicarboxylic acid, and 4,4'-biphenyldicarboxylic acid, without being limited thereto. These dicarboxylic acids may be used alone or in combination thereof. In some embodiments, polyvalent carboxylic acid components such as trimellitic acid, trimesic acid, and pyromellitic acid may be used together in a small amount, as needed.

Diamine

Diamine used as a raw material of the polyamide resin includes 1,10-decanediamine and 1,12-dodecanediamine, wherein a mole ratio of the 1,10-decanediamine to the 1,12-dodecanediamine (1,10-decanediamine:1,12-dodecanediamine) ranges from about 10:90 to about 65:35 or from about 15:85 to about 60:40 . More specifically, the mole ratio may range from about 30:70 to about 50:50 or from about 35:65 to about 45:55 . When the 1,10-decanediamine and the 1,12-dodecanediamine are used in a mole ratio in the above range, the melting point of the polyamide resin can be significantly reduced as compared to when only 1,11-undecanediamine is used. As a result, a molded article manufactured using the polyamide resin can exhibit high color stability at high temperature. The reason why the melting point of the polyamide resin is reduced is believed to be because, when a copolymer obtained using specific diamines, that is, 1,10-decanediamine and 1,12-dodecanediamine is used, the resin is difficult to have a crystalline structure due to reduced cohesion between molecule chains as compared with when only 1,11-undecanediamine is used.

In addition to 1,10-decanediamine and 1,12-dodecanediamine, the diamine may further include other diamines. A total sum of the 1,10-decanediamine and the 1,12-dodecanediamine is preferably about 90 mol % or more, about 95 mol % or more, about 98 mol % or more, or about 100 mol % based on the total mole number of the diamine included in the monomers to sufficiently provide effects of the present invention. Within this range, it is possible to further reduce the melting point of the polyamide resin.

The other diamines may be a $C_4$ to $C_{25}$ aliphatic alkylene diamine, without being limited thereto. Examples of the other diamines may include 1,4-butanediamine, 1,6-hexanediamine (hexamethylenediamine), 1,7-heptanediamine, 1,8-octanediamine, 1,9-nonanediamine, 1,11-undecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, and 2-methyl-1,8-octanediamine.

Examples of diamines excluding the $C_4$ to $C_{25}$ aliphatic alkylene diamine may include: ethylenediamine, propanediamine; alicyclic diamines such as cyclohexanediamine, methylcyclohexanediamine, isophorone diamine, bis(4-aminocyclohexyl)methane, 1,3-bisaminomethylcyclohexane, 1,4-bisaminomethylcyclohexane, norbornane dimethanamine, and tricyclodecane dimethanamine; and aromatic diamines such as para-phenylenediamine, meta-phenylenedi amine, xylylenediamine, 4,4'-diaminodiphenylsulfone, 4,4'-diaminodiphenyl ether. As used herein, the term "xylylenediamine" includes three types of xylylenediamine isomers, that is, ortho-xylylenediamine, meta-xylylenediamine (MXDA), and para-xylylenediamine (PXDA). The other diamines excluding the 1,10-decanediamine and the 1,12-dodecanediamine may be used alone or in combination thereof In one embodiment, the 1,4-cyclohexanedicarboxylic acid is used as the dicarboxylic acid, and the 1,10-decanediamine and the 1,12-dodecanediamine are used as the diamine in a predetermined ratio, thereby obtaining a polyamide resin having low melting point, as described above. Specifically, the polyamide resin according to the present invention may have a melting point of about 285° C. to 305° C., about 285° C. to about 300° C., or about 285° C. to about 295° C. Within this range of melting point, a molded article manufactured using the polyamide resin can exhibit significantly improved color stability at high temperature.

<Method of Preparing Polyamide Resin>

In one embodiment, the polyamide resin is prepared through polycondensation of the monomers including the dicarboxylic acid and the diamine as set forth above. Here, polycondensation may be performed by any typical method known in the art without limitation. For example, the polyamide resin may be prepared by a thermal polymerization method in which an aqueous solution of the dicarboxylic acid and the diamine is heated to high temperature and high pressure, followed by dehydration, or a method in which the dicarboxylic acid and the diamine are polycondensed under elevated temperature and pressure conditions to obtain a low-order condensate, followed by highly polymerizing the low-order condensate by any suitable method such as solution polymerization, melt polymerization, and solid polymerization. Particularly, the polyamide resin may be prepared by a method in which the dicarboxylic acid and the diamine are polycondensed to obtain a low-order condensate, followed by highly polymerizing the low-order condensate by solid polymerization.

In other words, the method of preparing a polyamide resin according to one embodiment includes process (1) preparing a low-order condensate through polycondensation of monomers including: 1,4-cyclohexanedicarboxylic acid; and 1,10-decanediamine and 1,12-dodecanediamine; and process (2) solid-polymerizing the low-order condensate. Next, each process of the method of preparing a polyamide resin according to the present invention will be described.

Process (1)

The low-order condensate may be prepared by placing an aqueous solution of the monomers or a salt thereof in, for example, a typical pressurized polymerization bath, and subjecting the same to polycondensation in an aqueous solvent while stirring.

The aqueous solvent refers to a solvent that contains water as a main component. As usable solvents besides water, any suitable solvent may be used without limitation so long as the solvent does not influence polycondensation reactivity or solubility, and examples of the solvent may include alcohols such as methanol, ethanol, propanol, butanol, and ethylene glycol.

The moisture content in a reaction system upon initiation of polycondensation has only to be set in such a way that the moisture content in the reaction system upon completion of polycondensation ranges from about 20 wt % to about 35 wt %. For example, the moisture content in the reaction system may range from about 20 wt % to about 60 wt % upon initiation of polycondensation. When the moisture content is about 20 wt % or more, a substantially homogeneous solution can be obtained upon initiation of polycondensation. When the moisture content is about 60 wt % or less, it is possible to reduce time and energy in removal of moisture through distillation upon polycondensation while suppressing thermal degradation of the low-order condensate due to extension of reaction time.

In this process, phosphorus catalysts may be used to improve polycondensation rate while preventing degradation upon polycondensation. Examples of the phosphorus catalysts may include hypophosphite, phosphate, hypophosphorous acid, phosphoric acid, phosphate ester, polymetaphosphates, polyphosphates, phosphine oxides, phosphonium halogen compounds, and the like. Specifically, hypophosphite, phosphate, hypophosphorous acid, and phosphoric acid may be used. Examples of the hypophosphite may include sodium hypophosphite, potassium hypophosphite, calcium hypophosphite, magnesium hypophosphite, aluminum hypophosphite, vanadium hypophosphite, manganese hypophosphite, zinc hypophosphite, lead hypophosphite, nickel hypophosphite, cobalt hypophosphite, ammonium hypophosphite, and the like. Specifically, sodium hypophosphite, potassium hypophosphite, calcium hypophosphite and magnesium hypophosphite may be used. Examples of the phosphate may include sodium phosphate, potassium phosphate, potassium dihydrogen phosphate, calcium phosphate, vanadium phosphate, magnesium phosphate, manganese phosphate, lead phosphate, nickel phosphate, cobalt phosphate, ammonium phosphate, diammonium hydrogen phosphate, and the like. The phosphate ester may include ethyloctadecyl phosphate. Examples of the polymetaphosphates may include sodium trimetaphosphate, sodium pentametaphosphate, sodium hexametaphosphate, polymetaphosphate, and the like. The polyphosphoric acid may include sodium tetrapolyphosphate. The phosphine oxide may include hexamethyl phosphoramide. The phosphorus catalysts may be provided in hydrate form.

The phosphorus catalyst may be present in an amount of about 0.0001 parts by weight to about 5 parts by weight, specifically about 0.001 parts by weight to about 1 part by weight, based on 100 parts by weight of the monomers. Within this range, it is possible to improve polycondensation rate while preventing degradation upon polycondensation. Although the phosphorus catalyst can be added at any time before solid polymerization is completed, the phosphorus catalyst is preferably added between charging of the raw materials and the completion of polycondensation of the low-order condensate. Further, the phosphorus catalyst may be introduced multiple times. Further, two or more other phosphorus catalysts may be combined therewith.

In addition, polycondensation may be carried out in the presence of an end-capping agent. The end-capping agent allows easy control of the molecular weight of the low-order condensate while improving melt stability of the low-order condensate. As the end-capping agent, any suitable end-capping agent may be used without limitation so long as the end-capping agent is a mono-functional compound having reactivity with a terminal amino group or a terminal carboxylic group, and examples of the end-capping agent may include monocarboxylic acids, monoamines, acid anhydrides such as anhydrous phthalic acid and the like, monoisocyanate, monoacid halides, monoesters, and monoalcohols. Specifically, monocarboxylic acids or monoamines may be used in terms of reactivity and stability of end-capping. More specifically, monocarboxylic acids may be used for easy handling.

As the monocarboxylic acids, any suitable monocarboxylic acid may be used without limitation so long as the monocarboxylic acid is reactive with an amino group. Examples of the monocarboxylic acids may include aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, isobutyric acid, and the like; alicyclic monocarboxylic acids such as cyclohexane carboxylic acid, and the like; aromatic monocarboxylic acids such as benzoic acid, toluic acid, a-naphthalene carboxylic acid, β-naphthalene carboxylic acid, methylnaphthalene carboxylic acid, phenylacetic acid, and the like; and mixtures thereof. Specifically, acetic acid, propionic acid, butyric acid, valeric acid, caproic acid, caprylic acid, lauric acid, tridecylic acid, myristic acid, palmitic acid, stearic acid, benzoic acid may be used given reactivity, stability of end-capping, price, and the like. As the monoamines, any suitable monoamine may be used without limitation so long as the monoamine has reactivity with a carboxylic group. Examples of the monoamines may include aliphatic monoamines such as methylamine, ethylamine, propylamine, butylamine, hexylamine, octylamine, decylamine, stearylamine, dimethylamine, diethylamine, dipropylamine, dibutylamine, and the like; alicyclic monoamines such as cyclohexylamine dicyclohexylamine, and the like; aromatic monoamines such as aniline, toluidine, diphenyl amine, naphthylamine, and the like; and mixtures thereof. Specifically, butylamine, hexylamine, octylamine, decylamine, stearylamine, cyclohexylamine, aniline may be used given reactivity, melting point, stability of end-capping, price, and the like.

The amount of the end-capping agent used in preparation of the low-order condensate may depend on reactivity and melting point of the end-capping agent, reaction apparatus, reaction conditions, and the like. For example, the end-capping agent may be present in an amount of about 0.1 mol % to about 15 mol % based on the total mole number of the dicarboxylic acid or the diamine.

Preparation of the low-order condensate according to the present invention may be performed at elevated temperature and pressure while stirring the reactants. The polymerization temperature may be controlled after introducing the raw materials, and the polymerization pressure may be controlled depending on the progress of polymerization.

In this process, the reaction temperature may range from about 200° C. to about 260° C., for example, from about 210° C. to about 250° C. When the reaction temperature is about 200° C. or more, it is possible to increase reaction rate while sufficiently enhancing molecular weight of the low-order condensate. In addition, when the reaction temperature is about 260° C. or less, it is possible to prevent color degradation of the polyamide due to excessive thermal history.

In this process, the reaction pressure may range about 0.5 MPa to about 5 MPa, for example, from about 1.0 MPa to about 4.5 MPa. Although polycondensation is performed while removing water through distillation, when the reaction pressure is about 0.5 MPa or more, the temperature and moisture content in a reaction system can be easily controlled. In addition, it is possible to prevent the low-order condensate from having low moisture content or prevent the low-order condensate from being cooled and solidified due to latent heat of water evaporation, thereby allowing the low-order condensate to be easily discharged. Further, when the reaction pressure is about 5 MPa or less, it is possible to use a reactor having low pressure resistance, which is relatively inexpensive, thereby providing benefits in terms of economic feasibility. Moreover, it is possible to prevent excessively high moisture content in the reaction system, thereby increasing the degree of polymerization of the low-order condensate.

In this process, the reaction time may range from about 0.5 hours to about 4 hours or from about 1 hour to about 3 hours. Herein, the reaction time refers to a period of time from a time point of reaching the reaction temperature of the present invention to initiation of discharging operation. When the reaction time is about 0.5 hours or more, reaction can reach sufficient reaction rate, whereby unreacted materials do not remain in the system and a homogeneous low-order condensate can be obtained. Further, when the reaction time is about 4 hours or less, it is possible to obtain a high quality low-order condensate without excessive thermal history.

In this process, the moisture content in the reaction system upon completion of reaction of the low-order condensate may range from about 15 wt % to about 35 wt %, for example, from about 20 wt % to about 35 wt %. Herein, the expression "upon completion of reaction" refers to a time point when the low-order condensate has a certain degree of polymerization to initiate an operation of discharging the low-order condensate, and the moisture content includes water of condensation produced during reaction. The moisture content to be introduced into the reaction system may be adjusted given the amount of water of condensation to be produced, or a predetermined amount of water may be distilled off or removed upon adjustment of the reaction pressure in a reactor equipped with a condenser and a pressure control valve. When the moisture content in the reaction system upon completion of reaction is about 15 wt % or more, precipitation or solidification of the low-order condensate substantially does not occur in the reaction system, whereby discharge of the low-order condensate can be easily carried out. In addition, when the moisture content in the reaction system upon completion of reaction is about 35 wt % or less, a low-order condensate having a sufficient degree of polymerization can be obtained. Further, the discharge rate can be enhanced due to low moisture content to be separated by evaporation and a need for a drying process before solid state polymerization can be eliminated, thereby improving preparation efficiency.

In this process, in order to obtain the low-order condensate, polycondensation may be performed in a batch mode or in a continuous mode. Further, polycondensation for producing the low-order condensate is preferably performed under stirring in order to inhibit adherence of the low-order condensate to a reaction chamber while securing uniform polymerization.

The low-order condensate obtained by this process may have an inherent viscosity (IV) of about 0.07 dL/g to about 0.40 dL/g, or about 0.10 dL/g to about 0.25 dL/g, as measured at 25° C. and at a concentration of 0.5 g/dL in concentrated sulfuric acid. A method of measuring the inherent viscosity (IV) will be described in Examples set forth below. When the inherent viscosity (IV) is about 0.07 dL/g or more, low melting point materials do not remain, and thus fusion or adherence of resin powder in/to the reactor upon solid polymerization can be prevented. When the inherent viscosity (IV) is about 0.40 dL/g or less, it is possible to prevent precipitation or solidification of the low-order condensate in the reaction system, thereby allowing the low-order condensate to be easily discharged.

The process may further include a salt adjustment process and/or an enrichment process prior to polymerization of the low-order condensate, as needed. The salt adjustment process refers to generation of salts from the dicarboxylic acid component and the diamine component. The salt adjustment process may be regulated to about pH±0.5 of a neutralization point of the salts, or to about pH±0.3 of a neutralization point of the salts. In the enrichment process, the raw materials may be enriched to have a concentration of about +2 wt % to about +90 wt %, or about +5 wt % to about +80 wt %. The enrichment process may be performed at about 90° C. to about 220° C., at about 100° C. to about 210° C., at about 130° C. to about 200° C. The enrichment process may be performed, for example, at about 0.1 MPa to about 2.0 MPa. Typically, the pressure of the enrichment process is controlled to be not more than the polymerization pressure. In order to promote the enrichment process, forced discharge by, for example, a nitrogen stream may be carried out. The enrichment process is effective in reduction of the polymerization time.

After the polycondensation, the method of preparing a polyamide resin may further include discharging and cooling of the low-order condensate. Discharging the low-order condensate from the reaction chamber is performed under atmospheric pressure or less in an inert gas atmosphere (for example, in nitrogen atmosphere). The process of discharging does not require a pressure vessel controlled to a specific pressure and separate supply of steam into the reaction chamber during removal of the low-order condensate from the reaction chamber. In addition, it is possible to obtain the low-order condensate in a simple and effective manner in the form of non-foam powder particles (powder or granules) exhibiting low thermal degradation, sufficiently high inherent viscosity, and high bulk density.

The inert gas atmosphere preferably has an oxygen concentration of about 1% by volume or less in order to inhibit oxidative degradation of the low-order condensate.

The discharge rate of the low-order condensate from the reaction chamber may be suitably adjusted depending upon the size of the reaction chamber, the amount of material in the reaction chamber, temperature, the size of a discharge outlet, the length of a nozzle, and the like. For example, discharge of the low-order condensate may be performed such that the discharge rate per cross-sectional area of the discharge outlet is about 2,000 kg/s/m$^2$ to about 20,000 kg/s/m$^2$. Within this range, since the obtained low-order condensate has a bulk density of, for example, about 0.35 g/cm$^3$ to about 0.8 g/cm$^3$, collapse, aggregation, and fusion to a reactor wall can thus be prevented or do not occur during solid polymerization described below, handling properties are excellent, and a large amount of low-order condensate can be supplied into a polymerization apparatus, thereby improving volume efficiency of the apparatus employed in solid polymerization.

Further, the low-order condensate discharged from the reaction chamber exhibits almost no thermal or oxidative degradation since the temperature of the low-order condensate is rapidly decreased to, for example, about 100° C. or less due to latent heat of vaporization when discharged.

Furthermore, since the low-order condensate discharged from the reaction chamber vaporizes most moisture by latent heat thereof, this process allows cooling and drying of the low-order condensate to be performed simultaneously. Discharge under inert gas atmosphere such as nitrogen and the like or under pressure below atmospheric pressure is preferred since efficiency of drying and cooling can be improved. In addition, a cyclone type solid-gas separation apparatus may be used as a discharge container in order to improve efficiency of drying and cooling by preventing powder scattering upon discharge while enabling discharge at a high linear gas velocity.

The low-order condensate may be subjected to compacting or crude milling in order to obtain further increased bulk density or a uniform particle diameter, as needed.

<Solid Polymerization>

Process (2)

In this process, the low-order condensate obtained in Process (1) is subjected to solid polymerization to obtain a polyamide resin.

Solid polymerization may be performed subsequent to discharge of the low-order condensate from the reaction chamber, after drying the low-order condensate discharged from the reaction chamber, after storing the low-order condensate discharged from the reaction chamber, or after subjecting the low-order condensate discharged from the reaction chamber to compacting or crude milling. When the low-order condensate is subjected to solid polymerization, that is, high degree polymerization, it is possible to obtain a polyamide resin that suffers from little thermal degradation.

The low-order condensate may be subjected to solid polymerization by any suitable method under any suitable conditions without limitation so long as high degree polymerization can be achieved while maintaining a solid state without causing any fusion, aggregation and deterioration of the low-order condensate.

In order to prevent oxidative degradation of the low-order condensate and the resulting polyamide, solid polymerization may be performed in in an atmosphere of an inert gas such as helium gas, argon gas, nitrogen gas, and carbon dioxide gas or under a reduced pressure.

Although the temperature of solid polymerization is not particularly limited, the maximum reaction temperature may range, for example, from about 170° C. to about 260° C., from about 200° C. to about 250° C., or from about 220° C. to about 240° C. Further, the maximum reaction temperature is not necessarily reached at the point at which solid polymerization is completed and may be reached at any time before completion of solid polymerization.

As an apparatus for solid polymerization employed in this process, any known apparatus may be used without limitation. Examples of the apparatus for solid polymerization may include uniaxial disks, kneaders, twin axial paddles, a vertical tower type apparatus, a vertical tower type device, a rotatory drum type or double cone type solid polymerization apparatus, a drying device, and the like.

Although not particularly limited, the reaction time for solid polymerization may be about 1 hour to about 20 hours. During solid polymerization, the low-order condensate may be stirred mechanically or by gas stream.

According to the preparation method as described above, it is possible to obtain a polyamide resin having high color stability at high temperature without causing problems in preparation such as gelation and the like.

<Polyamide Molded Article and Manufacturing Method>

The polyamide resin as set forth above is used in electric/electronic components or automotive parts, reflective materials, and the like after being subjected to a molding process. In other words, in accordance with another aspect of the present invention, there is provided a polyamide molded article manufactured using the polyamide resin as set forth above; and process (3) a method of manufacturing a polyamide molded article including molding the polyamide resin as set forth above. Next, a polyamide molded article according to the present invention and a method of manufacturing the same will be described.

As a method employed in the molding process, any suitable method may be used without limitation so long as the method can satisfy the requirement of heating to the melting point of the polyamide resin, since the polyamide resin according to the present invention does not need to be heated to a temperature above 320° C. due to low melting point, thereby reducing deterioration in color stability due to thermal degradation. Examples of the method may include injection molding, blow molding, extrusion molding, compression molding, and the like. Specifically, the polyamide resin molded article may be produced by injection molding. Injection molding allows use of a mold suited to the desired shape of a resin molded article, thereby manufacturing a resin molded article having a complicated shape.

The molding temperature of the polyamide resin may be about 320° C. or less, about 305° C. or less, about 300° C. or less, or about 295° C. or less, without being limited thereto. When the molding temperature is about 320° C. or less, it is possible to prevent thermal degradation of the polyamide resin and to prevent color deterioration the resulting molded article even when the molded article is used at high temperature. Herein, the molding temperature refers to the temperature of the polyamide resin, and the upper limit of the molding temperature refers to the highest temperature of the polyamide resin throughout the molding process. Although, as the lower limit of the molding temperature, any suitable temperature may be set without limitation so long as the temperature is above the melting point of the polyamide resin to allow molding of the resin, the lower limit of the molding temperature may be a temperature higher by +5° C., specifically +8° C. than the melting point of the polyamide resin.

In addition, the molding process may be performed in a non-oxidative atmosphere. Herein, the term "non-oxidative atmosphere" refers to an atmosphere having non-oxidative gas content of about 95% or more by volume. For example, the non-oxidative atmosphere is an oxygen free atmosphere having non-oxidative gas content of about 100% by volume. The non-oxidative atmosphere may be an inert gas atmosphere or a reductive gas atmosphere. Here, the inert gas may include helium (He), neon (Ne), argon (Ar), krypton (Kr), xenon (Xe), and nitrogen (N2), without being limited thereto. These inert gases may be used alone or in combination thereof. In addition, the inert gas may be mixed with a reductive gas. Here, the reductive gas may include hydrogen ($H_2$) gas and carbon monoxide (CO). Specifically, the inert gas is preferably used in terms of safety.

The polyamide molded article may further include any suitable additives in addition to the polyamide resin as set forth above. Examples of the additives may include fillers such as titanium oxide, titanium dioxide, titanium trioxide, zinc oxide, zirconium oxide, and zinc sulfide, fiber materials such as glass fiber and carbon fiber, inorganic powder fillers, organic powder fillers, antioxidants or heat stabilizers (for example, hindered phenol compounds, hydroquinone compounds, phosphite compounds, derivatives thereof, copper compounds, and the like), weathering agents (for example, resorcinol compounds, salicylate compounds, benzotriazole compounds, benzophenone compounds, hindered amine compounds, and the like), release agents and lubricants (for example, montanic acid and metal salts thereof, esters thereof, half esters thereof, stearyl alcohol, stearamide, various bisamides, bisurea, polyethylene wax, and the like), pigments (for example, cadmium sulfide, phthalocyanine, carbon black, and the like), dyes (for example, nigrosine, and the like), crystal nucleating agents (for example, talc, silica, kaolin, clay, and the like), plasticizers (for example, p-oxybenzoic acid octyl ester, N-butylbenzenesulfonamide, and the like), antistatic agents (for example, alkyl sulfate-type anionic antistatic agents, non-ionic antistatic agents such as polyoxyethylene sorbitan monostearate, betaine-based cationic antistatic agents, and the like), flame retardants (for example, red phosphorus, melamine cyanurate, hydroxides such as magnesium hydroxide and aluminum hydroxide, ammonium polyphosphate, bromine-based flame retardants such polystyrene bromide, polyphenylene ether bromide, and epoxy resin bromide, and combinations of the bromine-based flame retardants, antimony trioxide, and the like), and other polymers (for example, olefins, modified olefins, olefin copolymers such as ethylene/methyl acrylate copolymers, ethylene/ethyl acrylate copolymers, ethylene/propylene copolymers, and ethylene-1-butane copolymers, olefin copolymers such as propylene-1-butane copolymers, polystyrene, fluorine resins, silicon resins, liquid crystal polymers(LCP), and the like.

Although the amount of the additives in the polyamide molded article may vary depending on usage and functions of the molded article, the additives may be present in an amount of about 0 parts by weight or more to about 150 parts by weight or less, about 0 parts by weight or more to about 100 parts by weight or less based on 100 parts by weight of the polyamide resin.

The polyamide molded article may be used in electric • electronic components, automotive parts, reflective materials, and the like. Particularly, the polyamide molded article according to the present invention does not suffer from discoloration even when used at high temperature for a long time and thus can be used as a reflector. Specifically, the polyamide molded article according to the present invention may be used in various electric/electronic components, indoor luminaires, ceiling luminaires, outdoor luminaires, automotive lighting, displays, and reflectors for light emitting devices such as a headlight. Particularly, since LEDs are often operated at high temperature of about 100° C. due to increase in brightness and power output, the polyamide molded article according to the present invention having improved color stability at high temperature is useful as an LED reflector to maintain brightness of LEDs at a sufficient level.

EXAMPLES

Next, the present invention will be described in more detail with reference to some examples. It should be understood that these examples are provided for illustration only and are not to be construed in any way as limiting the invention. Measurement of inherent viscosity (IV), melting point, and color and a discoloration resistance test were performed as follows.

(1) Inherent Viscosity (IV)

A specimen solution was prepared by dissolving a specimen at a concentration of 0.5 g/dL in 96% concentrated sulfuric acid. Flow seconds of each of the 96% concentrated sulfuric acid (blank) and the specimen solution were measured using an Ubbelohde viscometer at 25° C. and the inherent viscosity was calculated according to Equation 1:

$$\eta_{inh} = \ln(\eta_{rel})/c \qquad \text{Equation [1]}$$

where $\eta_{rel}$ is t1/t0,
t1: flow seconds of the specimen,
t0: flow seconds of the blank, and
c: concentration of the solution (g/dL).

(2) Melting Point

With a differential scanning calorimeter (DSC) produced by Seiko Instruments Korea Inc., a non-crystalized sample was heated from 30° C. to a temperature 350° C. at a temperature increase rate of 10° C./min in a nitrogen atmosphere at a flow rate of 10 ml/min, maintained for 5 minutes, and cooled to 100° C. at a temperature decrease rate of 10° C./min to measure the glass transition temperature of the sample. Here, an endothermic peak temperature in the course of temperature elevation was measured as the melting point.

(3) Color

Color of a sample was measured using a compact color/whiteness meter NW-11 of Nippon Denshoku Industries Co., Ltd.

Illumination • Light reception conditions: 45° annular illumination, 0° light reception Measurement method: Diffraction grating, post-spectroscopy Measurement area: 10 mmϕ, Light source: Pulse Xenon lamp Standard illuminant, Observation condition: D65/2°

Measurement item: Yellowness index (YI)

(4) Discoloration Resistance Test (Color Stability at High Temperature)

A molded article was heated to 170° C. in an oven under an air atmosphere for 8 hours, followed by measuring the color of the molded article to compare with the color before heating, thereby evaluating discoloration resistance (color stability at high temperature).

Example 1

<Preparation of Polyamide Resin>

In a 1 L autoclave reactor equipped with a partial condenser, a pressure control valve, and a bottom discharge valve, 186.22 g (1.082 mole) of 1,4-cyclohexanedicarboxylic acid, 94.60 g (0.549 mole=50 mol %) of 1,10-decanediamine, 110.00 g (0.549 mole=50 mol %) of 1,12-dodecanediamine, 3.96 g (0.032 mole) of benzoic acid, 0.376 g (3.55 mmol, 0.1 parts by weight based on 100 parts by weight of charged raw materials) of sodium hypophosphite monohydrate, and 126 g (20% by weight based on the total weight of the charged raw materials) of water were placed, followed by purging with nitrogen. The temperature of the reactor was increased to 200° C. for 2 hours while stirring the raw materials. Here, the inner pressure of the reactor was 2 MPa. Then, after the inner temperature was maintained at 215° C., reaction was continued for 2 hours while removing water through distillation in order to maintain the inner pressure. After the inner pressure was reduced to 1.2 MPa, a prepared low-order condensate was discharged to a container at an atmospheric pressure through the bottom discharge valve at room temperature (25° C.) under a nitrogen atmosphere, thereby obtaining a low-order condensate in the form of a white powder.

Then, 300 g of the obtained low-order condensate was supplied into a 1000 mL round-bottom flask, which in turn was placed in a rotary evaporator equipped with an oil bath. After flushing with nitrogen, the flask was dipped in the oil bath while being rotated under supply of nitrogen at a flow rate of 1 L/min, and the inner temperature of the flask was increased to 230° C. for 1 hour, followed by solid polymerization at this temperature for 5 hours. After a certain period of reaction time, the inner temperature of the flask was lowered to room temperature (25° C.), thereby obtaining a highly polymerized polyamide resin.

<Manufacture of Polyamide Molded Article>

The polyamide resin was subjected to injection molding, thereby obtaining a polyamide molded article.

A strip-type specimen (80 mm×10 mm×4.0 mm) was prepared using an injection molding machine (SE SE18DUZ, Sumitomo Heavy Industries, Ltd.) under the following conditions:

Atmosphere in cylinder: Nitrogen ($N_2$) or air

Temperature of polyamide resin in cylinder: Temperature listed in Table 1

Mold temperature: 150° C.

Injection pressure: 120 MPa to 140 MPa

Injection rate: 30 mm/sec

Revolution number of screw: 150 rpm

Cooling time: 45 sec

Examples 2 to 7 and Comparative Examples 1 to 5

A polyamide resin and a polyamide molded article were prepared in the same manner as in Example 1 except that the kinds and amounts of monomers were changed as listed in Table 1.

Results are shown in FIG. 1 and FIG. 2.

TABLE 1

| | | Example | | | | | | |
|---|---|---|---|---|---|---|---|---|
| | | 1 | 2 | 3 | 4 | 5 | 6 | 7 |
| Monomer: Dicarboxylic acid (mol %) | 1,4-CHDA | 100 | 100 | 100 | 100 | 100 | 100 | 100 |
| | TPA | — | — | — | — | — | — | — |
| Monomer: Diamine (mol %) | 1,10-DDA | 50 | 30 | 65 | 10 | 45 | 35 | 40 |
| | 1,11-UDDA | — | — | — | — | — | — | — |
| | 1,12-DDDA | 50 | 70 | 35 | 90 | 55 | 65 | 60 |
| Properties of polyamide resin | IV (g/dL) | 0.92 | 0.87 | 0.93 | 0.91 | 0.90 | 0.91 | 0.92 |
| | Melting point (° C.) | 297 | 296 | 305 | 305 | 293 | 293 | 287 |
| Polyamide molded article (1): $N_2$ atmosphere | Molding temperature (° C.) | 320 | 320 | 320 | 320 | 315 | 315 | 310 |
| | Discoloration resistance test: YI (initial) | −46.3 | −46.9 | −46.1 | −46.5 | −46.2 | −46.4 | −46.9 |
| | Discoloration resistance test: YI (after heating to 170° C. for 8 h) | 5.7 | 5.5 | 7.4 | 7.3 | 4.3 | 4.0 | 3.1 |
| Polyamide molded article (2): Air atmosphere | Molding temperature (° C.) | — | — | — | — | — | 315 | 310 |
| | Discoloration resistance test: YI (initial) | — | — | — | — | — | −46.4 | −46.9 |
| | Discoloration resistance test: YI (after heating to 170° C. for 8 h) | — | — | — | — | — | 9.2 | 8.1 |

TABLE 2

| | | Comparative Example | | | | |
|---|---|---|---|---|---|---|
| | | 1 | 2 | 3 | 4 | 5 |
| Monomer: Dicarboxylic acid (mol %) | 1,4-CHDA | 100 | 100 | — | — | 100 |
| | TPA | — | — | 100 | 100 | — |
| Monomer: Diamine (mol %) | 1,10-DDA | 70 | 100 | — | 100 | — |
| | 1,11-UDDA | — | — | — | — | 100 |
| | 1,12-DDDA | 30 | — | 100 | — | — |
| Properties of polyamide resin | IV (g/dL) | 0.97 | 0.98 | 0.92 | 0.92 | 0.95 |
| | Melting point (° C.) | 317 | 336 | 297 | 320 | 306 |
| Polyamide molded | Molding temperature (° C.) | 340 | 340 | 310 | 340 | 320 |

TABLE 2-continued

| | | Comparative Example | | | | |
|---|---|---|---|---|---|---|
| | | 1 | 2 | 3 | 4 | 5 |
| article (1): N₂ atmosphere | Discoloration resistance test: YI (initial) | −46.8 | Molding impossible | −19.2 | 3.2 | −19.2 |
| | Discoloration resistance test: YI (after heating to 170° C. for 8 h) | 12.8 | — | 19.1 | 44.6 | 10.3 |
| Polyamide molded article (2): Air atmosphere | Molding temperature (° C.) | — | — | 310 | — | — |
| | Discoloration resistance test: YI (initial) | — | — | −17.8 | — | — |
| | Discoloration resistance test: YI (after heating to 170° C. for 8 h) | — | — | 25.3 | — | — |

1,4-CHDA: 1,4-cyclohexanedicarboxylic acid
TPA: Terephthalic acid
1,10-DDA: 1,10-decanediamine
1,11-UDDA: 1,11-undecanediamine
1,12-DDDA: 1,12-dodecanediamine From the results of Table 1, it can be seen that the polyamide resins of Examples 1 to 7, obtained by polycondensation of monomers including 1,4-cyclohexanedicarboxylic acid as dicarboxylic acid and including 1,10-decanediamine and 1,12-dodecanediamine as diamine in a mole ratio of about 10:90 to about 65:35 had low melting point and the molded articles manufactured using the polyamide resins exhibited high color stability at high temperature.

The polyamide resins of Examples 1, 2, and 5 to 7 including 1,10-decanediamine and 1,12-dodecanediamine in about 30:70 to about 50:50 (mole ratio) had a low melting point below 305° C., and, particularly, the polyamide resins of Examples 5 to 7 including 1,10-decanediamine and 1,12-dodecanediamine in about 35:65 to about 45:55 (mole ratio) had a low melting point below 300° C. In this regard, the polyamide molded articles (1) of Examples 1, 2, and 5 to 7 had a YI of about 5.7 or less as measured after being heated to 170° C. for 8 hours, and, particularly, the polyamide molded articles (1) of Examples 5 to 7 had a YI of about 4.3 or less. Thus, it can be seen the polyamide molded articles according to the present invention exhibited further improved color stability at high temperature.

In addition, from the results of comparison of YI of the polyamide molded articles as measured after heating to 170° C. for 8 hours, it can be seen that the polyamide molded articles (1) manufactured in an atmosphere of nitrogen, which is a non-oxidative gas, exhibited better color stability at high temperature than the polyamide molded articles (2) manufactured in an air atmosphere.

Conversely, from the results of Table 2, it can be seen that the polyamide resins and the molded articles obtained in Comparative Examples 1 to 5, in which the composition of the monomers departed from the scope of the present invention did not have desired properties (moldability and color stability at high temperature).

Consequently, according to the present invention, it is possible to provide a polyamide resin which allows a molded article manufactured using the same to exhibit high color stability at high temperature.

The invention claimed is:

1. A polyamide resin obtained through polycondensation of monomers comprising: 1,4-cyclohexanedicarboxylic acid; and 1,10-decanediamine and 1,12-dodecanediamine,
   wherein a mole ratio of the 1,10-decanediamine to the 1,12-dodecanediamine ranges from about 10:90 to about 65:35.

2. The polyamide resin according to claim 1, wherein the mole ratio of the 1,10-decanediamine to the 1,12-dodecanediamine ranges from about 30:70 to about 50:50.

3. The polyamide resin according to claim 1, wherein the mole ratio of the 1,10-decanediamine to the 1,12-dodecanediamine ranges from about 35:65 to about 45:55.

4. A polyamide molded article produced by molding the polyamide resin according to claim 1 at about 320° C. or less.

5. The polyamide molded article according to claim 4, produced by molding the polyamide resin according to claim 1 at about 320° C. or less under a non-oxidative atmosphere.

6. A method of preparing the polyamide resin according to claim 1, comprising:
   preparing a low-order condensate through polycondensation of the monomers; and
   solid-polymerizing the low-order condensate.

7. A method of manufacturing a polyamide molded article, comprising:
   molding the polyamide resin according to claim 1 at about 320° C. or less.

8. The method of manufacturing a polyamide molded article according to claim 7, wherein the molding is performed under a non-oxidative atmosphere.

9. The polyamide molded article according to claim 4, wherein the mole ratio of the 1,10-decanediamine to the 1,12-dodecanediamine ranges from about 30:70 to about 50:50.

10. The polyamide molded article according to claim 4, wherein the mole ratio of the 1,10-decanediamine to the 1,12-dodecanediamine ranges from about 35:65 to about 45:55.

11. The method of preparing the polyamide resin according to claim 6, wherein the mole ratio of the 1,10-decanediamine to the 1,12-dodecanediamine ranges from about 30:70 to about 50:50.

12. The method of preparing the polyamide resin according to claim 6, wherein the mole ratio of the 1,10-decanediamine to the 1,12-dodecanediamine ranges from about 35:65 to about 45:55.

13. The method of manufacturing a polyamide molded article according to claim 7, wherein the mole ratio of the 1,10-decanediamine to the 1,12-dodecanediamine ranges from about 30:70 to about 50:50.

14. The method of manufacturing a polyamide molded article according to claim 7, wherein the mole ratio of the 1,10-decanediamine to the 1,12-dodecanediamine ranges from about 35:65 to about 45:55.

15. A method of manufacturing a polyamide molded article, comprising:
    molding the polyamide resin prepared by the method according to claim 6 at about 320° C. or less.

16. The method of manufacturing a polyamide molded article according to claim 15, wherein the molding is performed under a non-oxidative atmosphere.

17. The polyamide resin according to claim 1, wherein the polyamide resin has a yellowness index (YI) of 7.4 or less after heating a molded article formed of the polyamide resin at 170° C. for 8 hours.

18. The polyamide resin according to claim 17, wherein the polyamide resin has a YI of 4.3 or less.

19. The polyamide resin according to claim 1, comprising:
    repeat units derived from a dicarboxylic acid component comprising about 75 mol % or more 1,4-cyclohexanedicarboxylic acid, based on the total mole percent of the dicarboxylic acid component; and
    repeat units derived from a diamine component comprising about 90 mol % or more of 1,10-decanediamine and 1,12-dodecanediamine, based on the total mole percent of the diamine component.

20. The polyamide resin according to claim 19, wherein the dicarboxylic acid component comprises 100 mol % 1,4-cyclohexanedicarboxylic acid.

21. The polyamide resin according to claim 1, wherein the polyamide has a melting point of about 285° C. to 305° C.

22. The polyamide resin according to claim 1, wherein:
    the polyamide resin comprises repeat units derived from a dicarboxylic acid component comprising 100 mol % 1,4-cyclohexanedicarboxylic acid; and repeat units derived from a diamine component comprising 100 mol % of 1,10-decanediamine and 1,12-dodecanediamine;
    the mole ratio of the 1,10-decanediamine to the 1,12-dodecanediamine ranges from about 35:65 to about 45:55; and
    the polyamide resin has a yellowness index (YI) of 3.1 to 4.3 after heating a molded article formed of the polyamide resin at 170° C. for 8 hours and a melting point of about 285° C. to about 295° C.

* * * * *